United States Patent
Jorgensen et al.

(10) Patent No.: US 8,468,455 B2
(45) Date of Patent: Jun. 18, 2013

(54) SYSTEM AND METHOD FOR PROVIDING VIRTUAL DESKTOP EXTENSIONS ON A CLIENT DESKTOP

(75) Inventors: Michael Jorgensen, Mapleton, UT (US); Michael Fairbanks, Lindon, UT (US); Jason Allen Sabin, Lehi, UT (US); Nathaniel Brent Kranendonk, Springville, UT (US); Kal A. Larsen, Springville, UT (US)

(73) Assignee: Novell, Inc., Provo, UT (US)

( * ) Notice: Subject to any disclaimer, the term of this patent is extended or adjusted under 35 U.S.C. 154(b) by 249 days.

(21) Appl. No.: 12/711,833

(22) Filed: Feb. 24, 2010

(65) Prior Publication Data

US 2011/0209064 A1    Aug. 25, 2011

(51) Int. Cl.
 *G06F 3/14* (2006.01)
(52) U.S. Cl.
 USPC ............... 715/733; 717/178; 718/1; 707/200; 707/610; 707/705; 709/204
(58) Field of Classification Search
 USPC .......... 715/200–277, 700–867; 700/701–866; 709/201–229; 705/50–79; 345/30–111; 707/200–206, 610; 717/178; 718/1
 See application file for complete search history.

(56) References Cited

U.S. PATENT DOCUMENTS

| | | | |
|---|---|---|---|
| 7,047,279 B1 | 5/2006 | Beams et al. | 709/204 |
| 7,280,991 B1 | 10/2007 | Beams et al. | 706/46 |
| 7,912,822 B2 * | 3/2011 | Bethlehem et al. | 707/705 |
| 2003/0023686 A1 | 1/2003 | Beams et al. | 709/205 |
| 2006/0005187 A1 | 1/2006 | Neil | 718/1 |
| 2006/0190391 A1 | 8/2006 | Cullen, III et al. | 705/37 |
| 2006/0206370 A1 | 9/2006 | Skopal | 705/9 |
| 2006/0265702 A1 | 11/2006 | Isaacson et al. | 717/168 |
| 2006/0265706 A1 | 11/2006 | Isaacson et al. | 717/174 |
| 2006/0277542 A1 | 12/2006 | Wipfel | 717/174 |
| 2007/0100712 A1 | 5/2007 | Kilpatrick et al. | 705/29 |
| 2007/0180450 A1 | 8/2007 | Croft et al. | 718/1 |
| 2007/0191979 A1 | 8/2007 | Zeng et al. | 700/97 |
| 2007/0198656 A1 | 8/2007 | Mazzaferri et al. | 709/218 |
| 2008/0098392 A1 | 4/2008 | Wipfel et al. | 718/1 |
| 2008/0098457 A1 | 4/2008 | Carter | 726/2 |
| 2008/0120126 A1 | 5/2008 | Bone | 705/1 |
| 2008/0147745 A1 * | 6/2008 | Wilkinson et al. | 707/200 |
| 2008/0256535 A1 | 10/2008 | Carter et al. | 718/1 |

(Continued)

OTHER PUBLICATIONS

White Paper: "A Blueprint for Better Management from the Desktop to the Data Center", Feb. 2007, Novell, Inc., 17 pages.

(Continued)

*Primary Examiner* — Ruay Ho
(74) *Attorney, Agent, or Firm* — Pillsbury Winthrop Shaw Pittman LLP

(57) ABSTRACT

The system and method described herein may identify one or more virtual desktop extensions available in a cloud computing environment and launch virtual machine instances to host the available virtual desktop extensions in the cloud. For example, a virtual desktop extension manager may receive a virtual desktop extension request from a client desktop and determine whether authentication credentials for the client desktop indicate that the client desktop has access to the requested virtual desktop extension. In response to authenticating the client desktop, the virtual desktop extension manager may then launch a virtual machine instance to host the virtual desktop extension in the cloud and provide the client desktop with information for locally controlling the virtual desktop extension remotely hosted in the cloud.

20 Claims, 6 Drawing Sheets

U.S. PATENT DOCUMENTS

| | | | | |
|---|---|---|---|---|
| 2008/0263629 | A1 | 10/2008 | Anderson | 726/2 |
| 2008/0281654 | A1 | 11/2008 | Carter et al. | 705/7 |
| 2009/0089625 | A1 | 4/2009 | Kannappan et al. | 714/39 |
| 2009/0249219 | A1 | 10/2009 | Best et al. | 715/748 |
| 2009/0276771 | A1 | 11/2009 | Nickolov et al. | 717/177 |
| 2009/0288082 | A1 | 11/2009 | Nazeer et al. | 718/1 |
| 2009/0323799 | A1 | 12/2009 | McDade, Sr. | 375/240.01 |
| 2010/0070970 | A1 | 3/2010 | Hu et al. | 718/1 |
| 2010/0115098 | A1 | 5/2010 | De Baer et al. | 709/226 |
| 2010/0262794 | A1 | 10/2010 | De Beer et al. | 711/162 |
| 2011/0010339 | A1 | 1/2011 | Wipfel et al. | 707/610 |
| 2011/0022658 | A1* | 1/2011 | Pace et al. | 709/204 |
| 2011/0041126 | A1 | 2/2011 | Levy et al. | 718/1 |
| 2011/0093847 | A1* | 4/2011 | Shah | 718/1 |
| 2011/0125894 | A1 | 5/2011 | Anderson et al. | 709/224 |
| 2011/0125895 | A1 | 5/2011 | Anderson et al. | 709/224 |
| 2011/0126047 | A1 | 5/2011 | Anderson et al. | 714/15 |
| 2011/0126099 | A1 | 5/2011 | Anderson et al. | 715/704 |
| 2011/0126192 | A1* | 5/2011 | Frost et al. | 717/178 |
| 2011/0126197 | A1 | 5/2011 | Larsen et al. | 718/1 |
| 2011/0126207 | A1 | 5/2011 | Wipfel et al. | 718/104 |
| 2011/0126275 | A1 | 5/2011 | Anderson et al. | 726/8 |
| 2011/0251992 | A1* | 10/2011 | Bethlehem et al. | 707/610 |

OTHER PUBLICATIONS

White Paper: "SOA + Workload Management + Application Infrastructure Virtualization: The Winning Combination for Meeting Service Delivery Goals", Sep. 2008, Ptak, Noel & Associates LLC, 12 pages, 2008

White Paper: "Novell® Architectural Foundation—A Technical Vision for Computing and Collaborating with Agility", Jan. 23, 2009, Novell, Inc., 61 pages.

Technical White Paper: "Automation for the New Data Center", copyright 2006, Novell, Inc., 11 pages.

Product Information Sheet: "VMware Virtual Infrastructure—Solutions for the Responsive Enterprise", copyright 2005, VMware, Inc., 4 pages.

Cialdini, Robert B., *Influence: The Psychology of Persuasion*, Collins Business Essentials, copyright 1984, 335 pages.

Freeman, Eric Thomas, "The Lifestreams Software Architecture", Dissertation, Yale University, May 1997, 185 pages.

Google Wave API Overview—Google Wave API—Google Code, printed from http://code.google.com/apis/wave/guide.html, copyright 2009, Google, 3 pages.

Lassen, Soren, et al., "Google Wave Federation Architecture", printed from http://www.waveprotocol.org/whitepapers/google-wave-architecture, 6 pages.

Rodger, Alan, "Technology Audit—SmartPeak WLM v7.1", Reference Code TA001227SIF, Apr. 2007, Butler Group, 9 pages.

Zhang, Hui, et al., "Intelligent Workload Factoring for a Hybrid Cloud Computing Model", NEC Laboratories America, 9 pages.

"Desktone Virtual-D Platform: Enabling Desktops as an Outsourced Subscription Service", copyright 2009 Desktone, Inc., 3 pages.

Wang, Li, et al., "Research on Intelligent Decision-Making Operation Modes in Modern Commerce Service Value Chain Model", CCECE/CCGEI, IEEE, May 5-7, 2008, 4 pages.

"A Guide to the Project Management Body of Knowledge PMBOK® Guide)", Project Management Institute, Inc., © 2008, 500 pages.

* cited by examiner

SYSTEM AND METHOD FOR PROVIDING VIRTUAL DESKTOP EXTENSIONS ON A CLIENT DESKTOP

FIELD OF THE INVENTION

The invention relates to a system and method for providing virtual desktop extensions on a client desktop, and in particular, to identifying services or applications available in virtualized or cloud data centers, launching virtual machine instances that run the available services or applications in the virtualized or cloud data centers, and provisioning local virtual desktop extensions on the client desktop to connect the client desktop with the virtual machine instances that run the available services or applications in the virtualized or cloud data centers.

BACKGROUND OF THE INVENTION

"Cloud computing" generally refers to computing that occurs in environments with dynamically scalable and often virtualized resources, which typically include networks that remotely provide services to client devices that interact with the remote services. For example, cloud computing environments often employ the concept of virtualization as a preferred paradigm for hosting workloads on any appropriate hardware. The cloud computing model has become increasingly viable for many enterprises for various reasons, including that the cloud infrastructure may permit information technology resources to be treated as utilities that can be automatically provisioned on demand, while also limiting the cost of services to actual resource consumption. Moreover, consumers of resources provided in cloud computing environments can leverage technologies that might otherwise be unavailable. Thus, as cloud computing and cloud storage become more pervasive, many enterprises will find that moving data center to cloud providers can yield economies of scale, among other advantages.

However, while much of the information technology industry moves toward cloud computing and virtualization environments, existing systems tend to fall short in adequately addressing concerns relating to managing or controlling workloads and storage in such environments. For example, cloud computing environments are generally designed to support generic business practices, meaning that individuals and organizations typically lack the ability to change many aspects of the platform. Moreover, concerns regarding performance, latency, reliability, and security present significant challenges, as outages and downtime can lead to lost business opportunities and decreased productivity, while the generic platform may present governance, risk, and compliance concerns. In other words, once organizations deploy workloads beyond the boundaries of their data centers, lack of visibility into the computing environment may result in significant management problems.

While these types of problems tend to be pervasive in cloud computing and virtualization environments due to the lack of transparency, existing systems for managing and controlling workloads that are physically deployed and/or locally deployed in home data centers tend to suffer from many similar problems. In particular, information technology has traditionally been managed in silos of automation, which are often disconnected from one another. For example, help desk systems typically involve a customer submitting a trouble ticket to a remedy system, with a human operator then using various tools to address the problem and close the ticket, while monitoring systems that watch the infrastructure to remediate problems may remain isolated from the interaction between the customer and the help desk despite such interaction being relevant to the monitoring system's function.

As such, because existing systems for managing infrastructure workloads operate within distinct silos that typically do not communicate with one another, context that has been exchanged between two entities can often be lost when the workload moves to the next step in the chain. When issues surrounding workload management are considered in the context of business objectives, wherein information technology processes and business issues collectively drive transitions from one silo to another, modern business tends to move at a speed that outpaces information technology's ability to serve business needs. Although emerging trends in virtualization, cloud computing, appliances, and other models for delivering services have the potential to allow information technology to catch up with the speed of business, many businesses lack the knowledge needed to intelligently implement these new technologies.

For example, emerging service delivery models often lead to deployed services being composed and aggregated in new and unexpected ways. In particular, rather than designing and modeling systems from the ground up, new functionality is often generated on-the-fly with complex building blocks that tend to include various services and applications that have traditionally been isolated and stand-alone. As such, even though many emerging service delivery models provide administrators and users with a wider range of information technology choices than have ever before been available, the diversity in technology often compounds business problems and increases the demand for an agile infrastructure. Thus, despite the advantages and promise that new service delivery models can offer businesses, existing systems tend to fall short in providing information technology tools that can inform businesses on how to intelligently implement an information technology infrastructure in a manner that best leverage available technology to suit the particular needs of a business.

Furthermore, in many instances, a client device may need to run applications or services that cannot run on a current desktop associated with the client device. For example, if a client device runs an operating system that lacks support for a particular application, adding support for the application would require the client device to connect to another machine that can run the application (e.g., Linux operating systems often lack support for Microsoft Word, whereby a client device that runs a Linux operating system would have to connect to another machine that can run Microsoft Word in order to provide support for Microsoft Word on the client device). In other contexts, the client device may further need access to the entire operating system that supports the desired application (e.g., to view and debug log files generated from running the application on a certain Linux distribution, version of Microsoft Windows, etc.). Further still, applications currently running on the client device may lack support for a document having a certain file type, whereby to open the document, the client device would then have to install new application that supports the file type or convert the document to a supported file type.

Although emerging service delivery models offers various ways to interact with information technology that may be new or otherwise unsupported on a particular client device, existing desktop interfaces typically have limited (if any) support for the diverse technologies typically employed in these emerging service delivery models. Moreover, adding support for particular operating systems, applications, file types, or other services can often, be tedious (e.g., a user may not want to perform the work needed to install new applications to support file types that will only be used rarely or occasionally, may not want to install new applications on the desktop, etc.). As such, cloud computing environments may be used to provide dynamically allocated resources that can support certain operating systems or applications, but existing systems for managing services in virtualized and cloud data centers tend to be complex and difficult to manage. In particular, existing systems for managing virtualized and cloud data centers tend to require substantial and specific knowledge in order to suitably locate, configure, and interact with services provided therein. For example, certain users may have multiple machines that interact with common or otherwise shared data, but configuring existing systems to make the shared data available to the multiple machines tends to be cumbersome (e.g., policies may restrict making sensitive data available in public clouds or outside corporate firewalls). Thus, although virtualized and cloud data centers can substantial flexibility in decoupling applications and services from underlying physical hardware, client devices tend to lack simple interfaces that can be used to create and interact with such applications and services on-demand.

SUMMARY OF THE INVENTION

According to one aspect of the invention, the system and method described herein may provide virtual desktop extensions on a client desktop to simplify complexity associated with identifying and using applications and services that run in virtualized and cloud data centers. For example, the client desktop may be provided with a list that describes various applications and services available in a virtualized or cloud data center, wherein a virtual desktop extension may be provided to the client desktop in response to a user selecting one or more of the available applications and services. Furthermore, in response to the user selecting a certain application or service in the list, an appropriate virtual machine instance configured to run the selected application or service may be launched in the virtualized or cloud data center. In one implementation, a virtual desktop extension manager may authenticate whether the client desktop has credentials permitting access to the selected application or service, connect the client desktop to the virtual machine instance in response to authenticating the client desktop, and enforce one or more policies to ensure that the client desktop and the virtual machine instance adhere to any appropriate policies associated with the application or service. As such, a user with no prior understanding of virtualization, cloud services, remote consoles, or other distributed computing models may simply choose the virtual desktop extension provided to the local client desktop in order to interact with the available applications and services running remotely in the virtualized or cloud data center.

According to one aspect of the invention, the system and method described herein may provide the virtual desktop extensions on the client desktop to simplify the complexity associated with identifying and using applications and services that run in virtualized and cloud data centers (e.g., a public cloud, a private cloud, etc.). For example, the client desktop may have a local application that displays a list describing various applications and services available in the public cloud and/or the private cloud, wherein a virtual desktop extension may then be provided to the client desktop in response to a user selecting one or more of the available applications and services. Furthermore, in response to the user selecting a certain application or service in the list, an appropriate virtual machine instance configured to run the selected application or service may be launched in the public cloud and/or the private cloud. As such, a user may simply choose the virtual desktop extension provided to the local client desktop to interact with the applications and services running remotely in the public and/or private cloud.

According to one aspect of the invention, the virtual desktop extensions provided to the client desktop may generally include any suitable application or service provided in the public cloud and/or the private cloud. For example, the virtual desktop extensions may include an application server that can run a certain application on a hosted virtual machine, a virtual desktop that can provide a complete desktop environment, a personal disk that can store data on a virtual disk, a document converter that can convert between different document file types, or any other available application or service in one or more cloud environments. Furthermore, the cloud environments may host different instances of the virtual desktop extensions, which may be provided from the public cloud or the private cloud depending on certain circumstances (e.g., unrestricted or insensitive data may be stored on a personal disk desktop extension provided from the public cloud, while restricted or sensitive data may be stored on a personal disk desktop extension provided from the private cloud).

According to one aspect of the invention, the system and method for providing virtual desktop extensions to the client desktop may include various initialization processes. In particular, the initialization processes may include installing a local application on the client desktop, connecting the local application to a virtual desktop extensions manager, and having the local application download a list from the virtual desktop extension manager that describes the virtual desktop extensions available to the client desktop. In addition, the initialization processes may further include the virtual desktop extension manager prompting the local application for authentication credentials associated with the client desktop and storing the authentication credentials in a credential cache locally coupled to the client desktop, whereby the local application may reference the authentication credentials in the credential cache to handle subsequent requests for virtual desktop extension from the client desktop. In one implementation, the initialization processes may further include installing the virtual desktop extension manager on a server deployed behind an organizational firewall, in the public cloud, in the private cloud, locally on the client desktop, or any other suitable location in communication with the client desktop. The virtual desktop extension manager may then be configured with one or more mappings that describe relationships between certain file types and the virtual desktop extensions available in the cloud environments, and further with one or more connection services that define interfaces for connecting, communicating, and otherwise interacting with the virtual desktop extensions. In one implementation, the virtual desktop extension manager may further include a policy engine and an identity engine that provides access control, policy enforcement, and compliance assurance for the applications and services provided through the virtual desktop extensions hosted in the cloud environments.

According to one aspect of the invention, in response to installing the local application and the virtual desktop extension manager, the client desktop may then request any virtual desktop extension available in the cloud environments. For example, the local application may place a desktop icon on the client desktop, wherein a user may click the desktop icon to launch the local application. In one implementation, the local application may include a background process that executes on the client desktop transparently, a foreground process that executes on the client desktop within a graphical user interface, or any suitable combination thereof. The local application executing on the client desktop may then provide the authentication credentials stored in the credential cache to the virtual desktop extension manager, which may authenticate the client desktop with the authentication credentials received from the local application (e.g., the virtual desktop extension manager may reference the authentication credentials to populate the list describing the virtual desktop extensions available to the client desktop). Furthermore, in one implementation, the policy engine and/or the identity engine may filter the list of virtual desktop extensions available to the client desktop based on certain criteria (e.g., the virtual desktop extensions may include various applications having access restricted to certain users, groups of users, etc.). In one implementation, the list of available virtual desktop extensions may then be displayed on the client desktop, whereby a user may request any of the virtual desktop extensions available to the client desktop.

According to one aspect of the invention, in response to a request from the client desktop that identifies one of the available virtual desktop extensions, the virtual desktop extension manager may determine whether the client desktop has permission to access or otherwise interact with the requested virtual desktop extension (e.g., by invoking the policy engine and/or the identity engine, which may authenticate the client desktop based on the authentication credentials received from the local application). Thus, in response to determining that the client desktop lacks permission to access or otherwise interact with the requested virtual desktop extension, the virtual desktop extension manager may notify the local application that the virtual desktop extension cannot be provided to the client desktop. Alternatively, in response to authenticating the client desktop, the virtual desktop extension manager may connect to a virtual machine that hosts the requested virtual desktop extension in the cloud environments and launch an instance of the requested virtual desktop extension on the virtual machine (e.g., provisioning a new virtual machine instance, loading an existing virtual machine instance and previously saved state information for the existing virtual machine instance, etc.).

According to one aspect of the invention, in response to launching the virtual desktop extension instance in the cloud environment, the virtual desktop extension manager may then generate remote console information that the client desktop can use to interact with the virtual desktop extension instance launched in the cloud environment (e.g., the remote console information may include any suitable virtual network computing system or other remote desktop control system that the client desktop can use to remotely control the virtual desktop extension instance). In response to the virtual desktop extension manager returning the remote console information to the client desktop, the local application may then create a desktop icon that can be selected to create a virtual window on the client desktop that can be used to remotely interact with the virtual desktop extension instance launched in the cloud (e.g., the virtual window may represent an entire virtual desktop environment, an application server that only represents a running instance of a particular application, etc.). As such, the client desktop may remotely interact with the virtual desktop extension instance in the cloud through the virtual window.

According to one aspect of the invention, the virtual desktop extensions available to the client desktop may further include a virtual personal disk, which the client desktop may request to dynamically allocate storage resources to the client desktop in the cloud environments. Thus, in response to receiving a request for a virtual personal disk from the client desktop, the local application may provide the client desktop with a desktop icon that represents a virtual personal disk managed in the cloud. Thus, a user may click on the desktop icon that represents the virtual personal disk, which may result in the virtual personal disk hosted in the cloud being made locally available on the client desktop. For example, in response to the user clicking on the desktop icon that represents the virtual personal disk, the virtual desktop extension manager may create a new virtual machine instance in the cloud and attach the virtual personal disk to the virtual machine instance. Alternatively, if the user previously created the virtual personal disk, the virtual desktop extension manager may load a previously created virtual machine instance that has been attached to the virtual personal disk, including any previously saved state that may be associated with the previously created virtual machine instance. In one implementation, the local application may then establish a Network File System (NFS) or other suitable network connection between the client desktop and the virtual machine instance attached to the virtual personal disk, whereby the client desktop may be provided with local control over the virtual personal disk hosted in the cloud.

According to one aspect of the invention, the client desktop may further use the local application and/or the virtual desktop extension manager to interact with documents that have file types otherwise lacking support on the client desktop. For example, in response to a user clicking on a document that the client desktop does not support (e.g., a document having an unknown file type), the local application may connect to the virtual desktop extension manager and identify the unsupported file type for the document. The virtual desktop extension manager may then launch a virtual machine instance for an application server that supports the identified file type and send the document to the application server instance. As such, the application server instance may then open the document in the cloud environment, and the virtual desktop extension manager may return remote console information to the client desktop that can be used to remotely interact with the document on the application server instance hosted in the cloud. The virtual desktop extension manager may then monitor the interaction between the client desktop and the document opened on the application server instance, wherein the virtual desktop extension manager may copy the document from the application server instance to the client desktop in response to determining that the document has been modified on the application server (i.e., a version of the document stored on the client desktop may be replaced with the document modified on the application server to synchronize the document between the client desktop and the application server).

According to one aspect of the invention, rather than opening the unsupported document on the application server instance hosted in the cloud, the virtual desktop extension manager may invoke the policy engine to identify a virtual machine instance in the cloud hosting a document converter that can convert the unsupported document to a file type that the client desktop does support. For example, the policy engine may determine one or more file types that the client desktop supports and one or more file types that the document converter running in the cloud support (e.g., from the mappings that initially configured the virtual desktop extension manager). Thus, in response to identifying an appropriate virtual machine instance hosting a document converter that can convert the document to a file type that the client desktop supports, the virtual desktop extension manager may provide the unsupported document to the document converter hosted on the identified virtual machine instance. The document converter may then convert the unsupported document to one of the file types that the client desktop supports, and the converted document may then be returned to the client desktop. Thus, the client desktop may then open the document with any suitable application on the client desktop that supports the converted document file type.

According to one aspect of the invention, the system and method described herein may generally operate in a computing environment having a fluid architecture that can create common threads for converging information relating to user identities and access credentials, provisioned and requested services, and physical and virtual infrastructure resources, among other things. In one implementation, services provided in the computing environment may generally include various aggregated physical and/or virtual resources, while applications may include various aggregated services and workloads may include various compositions of whole services, separate services, and/or sub-services that work together. For example, in response to a user requesting a service that performs a particular function or application, a workload may be created to manage provisioning the user with a tuned appliance configured to perform the particular function or application, whereby the tuned appliance may provide the requested service for the user. To manage the workload, the system and method described herein may create a resource store that points to a storage location for the appliance, declare a service level agreement and any runtime requirements that constrain deployment for the appliance, obtain a certificate that provides attestation tokens for the user and the appliance, and create a profile that provides an audit trail of actual lifecycle behavior for the appliance (e.g., events and performance metrics relating to the appliance). Thus, workflows created in the computing environment may converge various sources of information within a common thread, which may then be used to manage the workload (e.g., actual metrics for a particular workload can be compared to anticipated metrics for the workload to determine whether various services underlying the workload function as intended).

According to one aspect of the invention, the system and method for providing virtual desktop extensions may further operate in a model-driven architecture, which may merge information relating to user identities with services that may be running in an information technology infrastructure. As such, the information merged in the model-driven architecture may be referenced to determine specific users or organizational areas within the infrastructure that may be impacted in response to a particular change to the infrastructure model. Thus, whereas information technology has traditionally been managed within disparate silos, where context exchanged between any two entities may be lost at the next step in the chain, the model-driven architecture may track context for information technology workloads from start to finish. As such, tracking context for the information technology workloads may provide audit trails that can then be used to identify a relevant user, application, system, or other entity that can provide assistance with a particular issue. Moreover, in the context of managing workloads for virtualized services, where different users typically have to communicate with one another on-demand, the audit trail that the model-driven architecture enables may track end-to-end workload activities and thereby provide visibility and notice to users, applications, systems, services, or any other suitable entity that may be impacted by the workload.

According to one aspect of the invention, the system and method for providing virtual desktop extensions may enable agile and flexible management for an information technology infrastructure, which may enable the infrastructure to move at the speed of modern business. For example, the system and method for providing virtual desktop extensions may further operate in a service-oriented architecture unifying various heterogeneous technologies, which may provide businesses with the capability to deploy information technology resources in a manner that can meet business objectives. For example, the service-oriented architecture may provide adaptable, interoperable, and user-friendly information technology tools to manage the infrastructure in a manner that addresses many typical business challenges that information technology organizations face. For example, while the model-driven architecture may employ virtualization features to provide manageable workloads that can move efficiently through the infrastructure, the service-oriented architecture may merge different technologies to provide various coordinated systems that can cooperate to optimally execute portions of an overall orchestrated workload. As such, the model-driven and service-oriented architectures may collectively derive data from the information technology infrastructure, which may inform intelligent information technology choices that meet the needs of businesses and users.

Other objects and advantages of the invention will be apparent to those skilled in the art based on the following drawings and detailed description.

DETAILED DESCRIPTION

Figure 1:
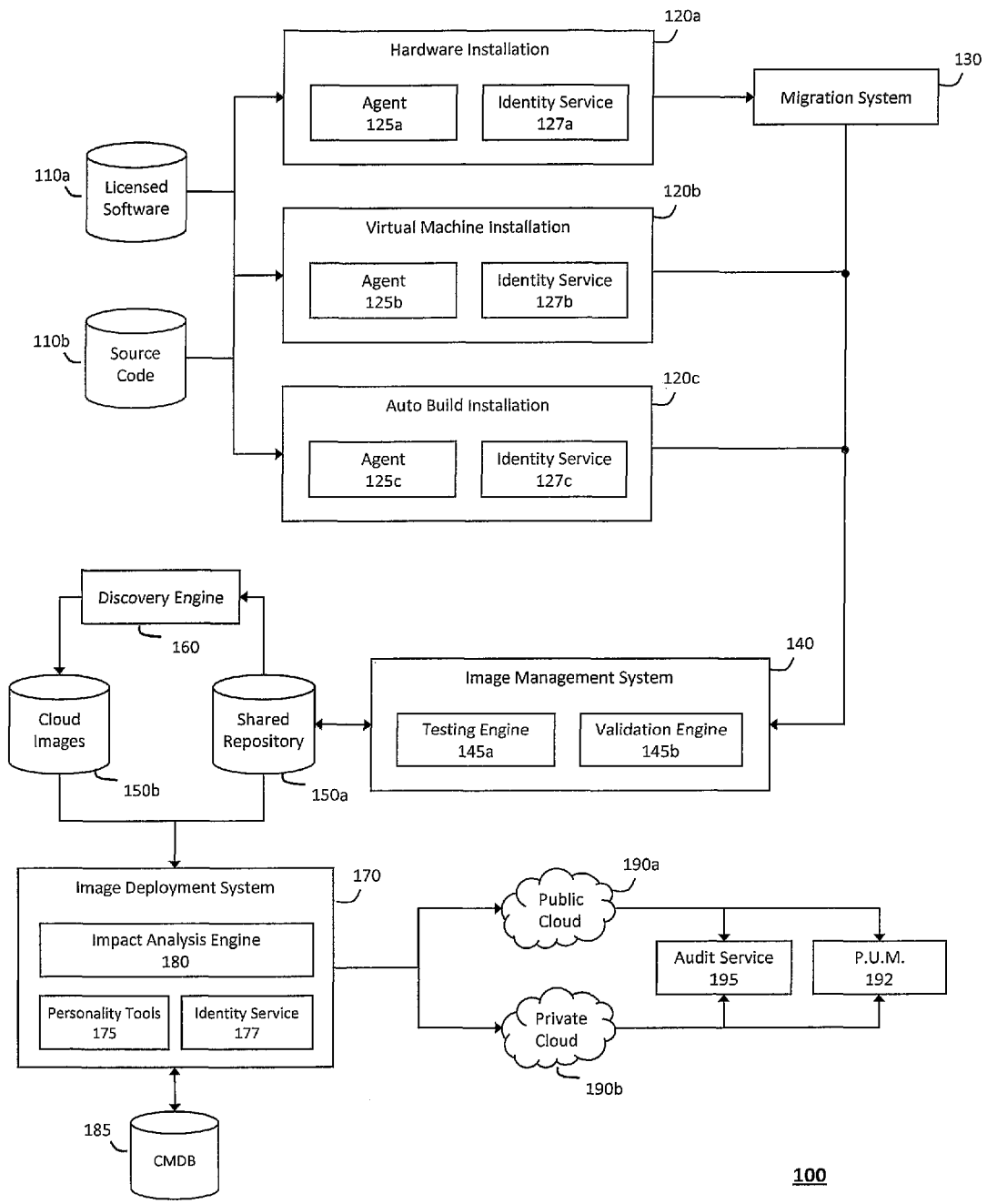
FIG. 1 illustrates a block diagram of an exemplary system for controlling cloud and virtualized data centers in the system for providing virtual desktop extensions on a client desktop, according to one aspect of the invention.

According to one aspect of the invention, FIG. 1 illustrates a block diagram of an exemplary system 100 for controlling cloud and virtualized data centers in the system for providing virtual desktop extensions on a client desktop. In particular, as noted above, cloud and virtualized data centers generally include various dynamically allocated resources that can have unpredictable characteristics. Thus, the system 100 shown in FIG. 1 and described herein may coordinate such dynamically allocated resources in a closed-loop management infrastructure that can manage declarative policies, fine-grained access controls, and orchestrated management and monitoring tools. In one implementation, the system 100 may operate in a workload management system that provides various mechanisms for automatically creating images that can be deployed to a public cloud (or cloud data center) 190a external to an information technology infrastructure, and which can further be deployed to a private cloud (or virtualized data center) 190b deployed locally within the infrastructure (e.g., as described in co-pending U.S. patent application Ser. No. 12/645,114, entitled "System and Method for Controlling Cloud and Virtualized Data Centers in an Intelligent Workload Management System," filed Dec. 22, 2009, the contents of which are hereby incorporated by reference in entirety). In addition, the system 100 may be used to install software contained in licensed software repositories 110a, source code repositories 110b, or other suitable software sources onto any images that have been deployed to the public cloud 190a or the private cloud 190b, control and audit activity that occurs in the images deployed to the public cloud 190a or the private cloud 190b, establish and retrieve network addresses (e.g., IP addresses, DHCP addresses, etc.) for cloned images across various operating platforms (e.g., Windows platforms, Linux platforms, etc.), and analyze any impact that the activity occurring in the images deployed to the public cloud 190a or the private cloud 190b may have on other machines or images.

As such, the system 100 shown in FIG. 1 and described herein may generally include various features that can provide predictability in controlling images, virtual machines, or other resources that have been deployed to the public cloud 190a and/or the private cloud 190b. In particular, in one implementation, the system 100 may include a licensed software repository 110a that contains licensed software, a source code repository 110b that contains software source code, or any other suitable software repository. In one implementation, the licensed software in the licensed software repository 110a, the software source code in the source code repository 110b, or other software may then installed over suitable hardware resources to create one or more hardware installations 120a, installed on a virtual machine to create one or more virtual machine installations 120b, and/or built within a suitable build system to create one or more auto build installations 120c. In one implementation, in response to installing or otherwise creating the hardware installations 120a, the virtual machine installations 120b, and the auto build installations 120c, an appropriate management agent 125 may be inserted into the installation 120. In particular, the management agent 125 may provide functionality for performing various tasks to manage the licensed software, source code, or other software included in the installations 120. For example, in one implementation, the tasks performed by the management agents 125 may include retrieving DHCP addresses, establishing static IP addresses, providing remote debugging assistance, and inserting one or more personality tools 175 (e.g., privileged user management) for the installations 120.

In one implementation, the hardware installations 120a, virtual machine installations 120b, and auto build installations 120c may each further include a respective identity service 127 that provides a unique identity for the respective installations 120. For example, in one implementation, the identity services 127 may generally include authentication tokens that define one or more federated authorizations or permissions for the respective installations 120 (e.g., across a plurality of authentication domains). As such, the management agents 125 inserted into the various software installations 120 may interact with the identity services 127 that define the authorizations or permissions for the various software installations 120 to uniquely identify and manage the various installations 120. For example, in addition to defining the authorizations or permissions for the various installations 120, the identity services 127 may further identify versions, builds, or other information that can uniquely identify the licensed software, source code, or other software included in the installation, which may enable management for such licensed software, source code, or other software (e.g., in response to detecting updates to the licensed software, source code, or other software in the licensed software repository 110a or the source code repository 110b, the integrated identity services 127 may be referenced to identify and appropriately update any installations 120 that may have been created from the updated software).

In one implementation, in response to creating the various software installations 120 and embedding the suitable management agents 125a and identity services 127, various operational images may be created from the software installations 120. In particular, the virtual machine installations 120b and the auto build installations 120c may generally include one or more virtual machine images, while the hardware installations 120a may generally include software that executes directly over underlying hardware resources (e.g., as described in further detail in co-pending U.S. patent application Ser. No. 12/645,114, incorporated by reference above). The operational images created from the virtual machine installations 120b and the auto build installations 120c may therefore include the virtual machine images included therein, wherein the operational virtual machine images may be provided to an image management system 140 that stores the operational virtual machine images in a shared repository 150a (e.g., an image repository). With respect to the hardware installations 120a that include software executing directly over underlying hardware resources rather than virtual machine images, a migration system 130 may provide functionality that can create a suitable operational virtual machine image from the hardware installations 120a. The migration system 130 may evaluate any licensed software, source code, packages, or other software included in the hardware installations 120a and create operational virtual machine images that can run in a virtualized environment. For example, in one implementation, the migration system 130 may include a Novell PlateSpin Migrate system 130, a VMware vCenter Converter system 130, or any other suitable migration system 130 that provides conversion or migration services between physical and virtual platforms. The operational virtual machine image created from the hardware installation 120a may then be provided to the image management system 140, which may store the operational virtual machine image in the shared repository 150a in a similar manner as the virtual machine installations 120b and the auto build installations 120c.

In one implementation, in response to providing the operational images created from the hardware installations 120a, the virtual machine installations 120b, and the auto build installations 120c to the image management system 140, the image management system 140 may automatically store the operational images in the shared repository 150a in response to determining that the operational images do not need to be tested for operational integrity (e.g., because the operational images include an attestation token indicating that the operational images have already passed operational integrity tests). Alternatively, the image management system 140 may optionally invoke a testing engine 145a that performs one or more operational integrity tests for the operational images prior to storing the operational images in the shared repository 150a. For example, the operational integrity tests performed by the testing engine 145a may test the operational images against various test scripts designed to verify integrity for the operational images (e.g., validating checksums, installer functionality, etc.). Thus, in response to the testing engine 145a determining that one or more of the operational images have passed the operational integrity tests, such operational images may be released to the shared repository 150a. Alternatively, in response to the testing engine 145a determining that one or more of the operational images did not pass the operational integrity tests, the image management system 140 may invoke a validation engine 140 that supervises debugging and revalidation for such operational images (e.g., generating a validation workload to coordinate collaborative interaction among various entities that debug and revalidate the operational images until the operational images eventually pass the operational integrity tests). The validation engine 145b may then re-invoke the testing engine 145a to determine whether the operational images have been debugged or otherwise revalidated in a manner that results in the operational images passing the integrity tests, wherein the operational images may be released to the shared repository 150a in response to passing the integrity tests or, prevented from such release in response to not passing the integrity tests.

In one implementation, the system 100 may further include a discovery engine 160 that continually monitors the shared repository 150a to detect whether one or more operational images have been newly added to the shared repository 150a. Further, in one implementation, the image management system 140, the shared repository 150a, or another suitable component in the system 100 may generate an event in response to one or more operational images being added to the shared repository 150a, wherein the event may notify or otherwise advertise the new operational images to the discovery engine 160. In one implementation, in response to the discovery engine 160 detecting the new operational images in the shared repository 150a or receiving the event notifying or advertising the new operational images in the shared repository 150a, the discovery engine 160 may prepare the operational images for deployment to the public cloud 190a or the private cloud 190b. In particular, various public clouds 190a and private clouds 190b may support different image formats, wherein the discovery engine 160 may convert the operational images into the appropriate image format for the public cloud 190a or private cloud 190b where the operational images will be deployed (e.g., an Amazon Machine Image format for the Amazon Elastic Compute Cloud). Thus, the cloud image repository 150b may contain various cloud images created from the operational images in the shared repository 150a, wherein the various cloud images may be in various different formats depending on the image format for the public cloud 190a or private cloud 190b that will host the cloud images.

In one implementation, in response to storing the cloud images in the cloud image repository 150b, an image deployment system 170 may be invoked to deploy the cloud images to the appropriate public cloud 190a or private cloud 190b. In one implementation, prior to deploying the cloud images to the appropriate public cloud 190a or private cloud 190b, the image deployment system 170 may invoke an impact analysis engine 180 that determines a potential impact of deploying the cloud images to the public cloud 190a or private cloud 190b. In particular, deploying the cloud images to the public cloud 190a or private cloud 190b may generally include various deployment processes (e.g., starting, stopping, cloning, or migrating the cloud images). Thus, the impact analysis engine 170 may reference a configuration management database 185 to validate whether the cloud images can be suitably deployed to the public cloud 190a or the private cloud 190b. For example, the impact analysis engine 170 may reference the configuration management database 185 to verify that other resources detailed in the configuration management database 185 will not be adversely affected by deploying the cloud images (e.g., because the deployment may require substantial bandwidth during a period of peak network traffic). Furthermore, the impact analysis engine 170 may communicate with an audit service 195, a privileged user management service 192, or other monitoring services provided in the public cloud 190a or the private cloud 190b to enhance the impact analysis (e.g., determining whether conditions in the public cloud 190a or private cloud 190b may have adverse impacts on the deployment, local infrastructure resources, etc.).

In one implementation, in response to the impact analysis engine 170 determining that deploying the cloud images does not raise potential adverse impacts, or alternatively in response to resolving any such potential adverse impacts, the image deployment system 170 may deploy the cloud images in the cloud image repository 150b to the appropriate public cloud 190a or private cloud 190b. Further, in one implementation, the operational images in the shared repository 150a may already be appropriate for deployment into the public cloud 190a or private cloud 190b without requiring conversion to a cloud image format, in which case the image deployment system 170 may similarly deploy the operational images in the shared repository 150a to the public cloud 190a or private cloud 190b. In one implementation, to deploy the cloud images or operational images to the public cloud 190a or private cloud 190b, the image deployment system 170 may clone or modify the cloud images or operational images (e.g., to preserve an original version of the cloud images or operational images prior to the cloud deployment). As such, in response to cloning or modifying the images prior to the cloud deployment, the image deployment system 170 may inject a new or aggregated identity service 177 into the cloned or modified images, wherein the new or aggregated identity service 177 may provide a record that identifies a lineage, pedigree, or other relationships for the cloned or modified images. Furthermore, the image deployment system 170 may inject one or more personality tools 175 into the cloned or modified images in response to determining that the personality tools 175 have not already been injected (e.g., during creation of the original software installations 120). For example, as noted above, the personality tools 175 may generally include tools for privileged user management, remote debugging, or customizing base images (e.g., certain scripts may be applied to a Linux base image in order to customize the base image for particular functions that the image provides).

In one, implementation, the image deployment system 170 may then deploy the cloud images or the operational images to the appropriate public cloud 190a or private cloud 190b, wherein the deployed images may be managed in the public cloud 190a and the private cloud 190b. For example, as noted above, the images may include embedded management agents 125 that can control and track any activity associated with the deployed images through interaction with the embedded identity services 127, including verifying that the images comply with any relevant policies or restricting any activity that may not comply with the relevant policies (e.g., as described in further detail in co-pending U.S. patent application Ser. No. 12/645,114, incorporated by reference above). Further, because the management agents 125, identity services 127 (and/or 177), and personality tools 175 embedded in the images can control, track, and monitor activities for the images that have been deployed to the public cloud 190a and the private cloud 190b, the monitored activity may be provided to an audit service 195 that can remediate the activity in response to any problems with the images, provide compliance assurance for the activity associated with the images, or otherwise analyze activity that occurs in the images following deployment to the public cloud 190*a* or the private cloud 190*b*. Similarly, the embedded identity services 127 (and/or 177) may interact with a privileged user management service 192 in the public cloud 190*a* or the private cloud 190*b*, wherein the privileged user management service 192 and the audit service 195 may cooperate in various ways to remediate, assure compliance, or otherwise analyze the activity that occurs in the images following deployment to the public cloud 190*a* or the private cloud 190*b*.

Figure 2:
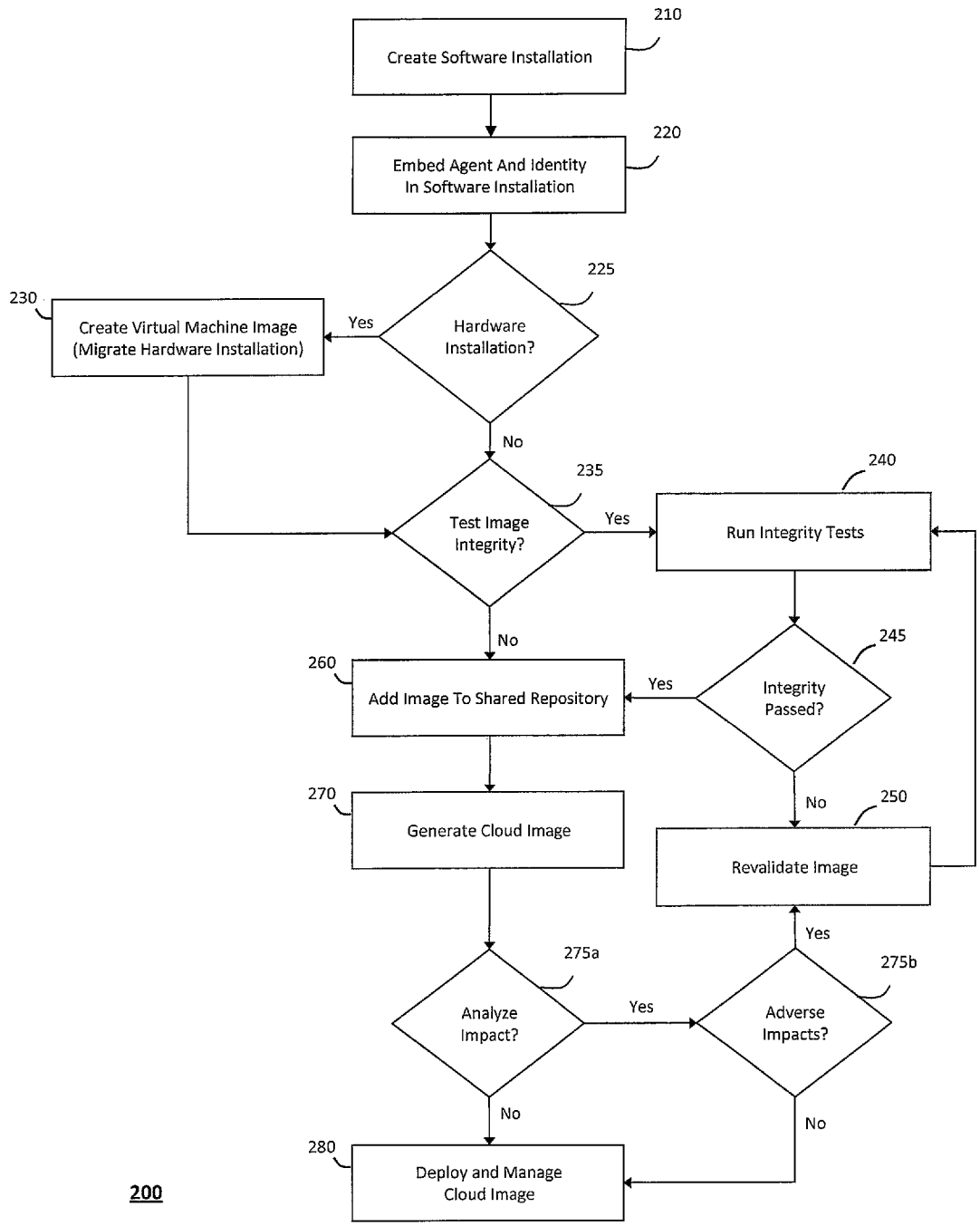
FIG. 2 illustrates a flow diagram of an exemplary method for controlling cloud and virtualized data centers in the system for providing virtual desktop extensions on a client desktop, according to one aspect of the invention.

According to one aspect of the invention, FIG. 2 illustrates a flow diagram of an exemplary method 200 for controlling cloud and virtualized data centers in the system for providing virtual desktop extensions on a client desktop. In particular, the method 200 may generally operate in the system 100 shown in FIG. 1 and described in further detail above, whereby the method 200 may provide predictability in controlling images, virtual machines, or other resources that have been deployed to public clouds (or cloud data centers) and private clouds (or virtualized data centers). For example, as noted above in connection with FIG. 1, control over the cloud data centers and the virtualized data centers may be provided through various features that can automatically create and deploy images to the public clouds and the private clouds, install software from repositories that contain licensed software, source code, or other software onto the images deployed to the public or private clouds, control and audit activity that occurs in the deployed images, establish and retrieve network addresses or other network configurations for cloned images across various operating platforms, and analyze impacts that activity occurring in the deployed images may have on other machines or images to generate appropriate decisions for managing and controlling the data centers provided in the public and private clouds.

In particular, in one implementation, the method 200 may retrieve licensed software from a licensed software repository, software source code from a source code repository, or other software from another suitable repository, wherein an operation 210 may include creating a software installation from the licensed software, the software source code, or the other software. In one implementation, the software installation created in operation 210 may include a hardware installation installed over suitable hardware resources, a virtual machine installation installed on a virtual machine, and/or an auto build installation built using a suitable build system. In response to installing or otherwise creating the software installation in operation 210, an appropriate management agent may then be embedded in the software installation in an operation 220. For example, the management agent embedded in the software installation in operation 220 may provide functionality for performing various tasks to manage the licensed software, source code, or other software included in the software installation (e.g., DHCP address retrieval, static IP address assignment, remote debugging, personality or privileged user management insertion, etc.).

In one implementation, operation 220 may further include embedding an identity service within the software installation created in operation 210. In particular, the identity service may generally provide a unique identity for the software installation, and may further include an authentication token that defines one or more federated authorizations or permissions for the software installation across a plurality of authentication domains. As such, the management agent and the identity service embedded in the software installation in operation 220 may interact with one another, whereby the management agent may reference the identity service to determine a unique identity for the software installation, resolve the authorizations or permissions for the software installation from the unique identity, and otherwise manage the software installation. For example, in addition to defining authorizations or permissions that control resources that the software installation can access, the identity service may further identify a version, build, or other information that uniquely identifies the licensed software, source code, or other software included in the installation. As such, the interaction between the management agent and the identity service may be used to manage the licensed software, source code, or other software included in the installation. For example, in one implementation, the embedded management agent may reference the embedded identity service to determine whether the installation was created from licensed software, source code, or other software that has been updated in the licensed software repository or the source code repository and then appropriately update the installation in response to determining that the installation was created from the updated software.

In one implementation, in response to creating the software installation and embedding the management agent and the identity service, an operational image may be created from the software installation. In particular, an operation 225 may include determining whether the software installation includes a hardware installation, a virtual machine installation, or an auto build installation, wherein virtual machine installations and auto build installations generally include one or more virtual machine images, as described in further detail above. Thus, in response to determining that the software installation includes a virtual machine installation or an auto build installation in operation 225, creating the operational image may include providing the virtual machine images included therein to an image management system that stores the operational virtual machine images in a shared repository (e.g., an image repository). Alternatively, hardware installations may generally include software that executes directly over underlying hardware resources, whereby an operation 230 may include creating a virtual machine from the hardware installation to prepare the hardware installation for migration to a virtualized environment. In particular, operation 230 may invoke a migration system providing functionality for creating operational virtual machine images from hardware installations, wherein the migration system may evaluate any licensed software, source code, packages, or other software included in the hardware installation and appropriately create the operational virtual machine image. For example, the migration system may include Novell PlateSpin Migrate, VMware vCenter Converter, or any other migration system that provides conversion or migration services between physical and virtual platforms. The operational virtual machine image created from the hardware installation may then be provided to the image management system, which may store the operational virtual machine image in the shared repository in a similar manner as for virtual machine installations or auto build installations.

In one implementation, in response to providing the operational image created from the software installation to the image management system, an operation 235 may include determining whether or not to test the operational images for operational integrity. For example, an operation 260 may include the image management system automatically storing the operational image in the shared repository in response to determining that the operational image does not need to be tested (e.g., because the operational image includes an attestation token indicating that the operational image has already passed operational integrity tests). Alternatively, an operation 240 may include the image management system optionally invoking a testing engine that runs one or more operational integrity tests for the operational image prior to storing the operational image in the shared repository. For example, the operational integrity tests run in operation 240 may test the operational image against various test scripts designed to verify integrity for the operational image (e.g., validating checksums, installer functionality, etc.). Thus, an operation 245 may include determining whether the operational image passed the operational integrity tests, wherein the operational image may be released to the shared repository in operation 260 in response to the operational image passing the integrity tests. Alternatively, in response determining that the operational image did not pass the operational integrity tests in operation 245, a validation engine may be invoked in an operation 250, wherein the validation engine may supervise debugging and revalidation for the operational image (e.g., generating a debugging workload to coordinate collaborative interaction among various entities associated with the failed operational image). The validation engine may then re-invoke operation 240 to determine whether the operational image has been debugged or otherwise revalidated in a manner that results in the operational image passing the integrity tests, wherein the operational image may be released to the shared repository in operation 260 in response to passing the integrity tests, whereas the operational image may be iteratively debugged and revalidated in operations 240 through 250 until the operational image successfully passes the integrity tests.

In one implementation, a discovery engine may continually monitor the shared repository to detect whether the operational image has been newly added to the shared repository. Alternatively, the image management system, the shared repository, or another component may generate an event in response to adding the operational image to the shared repository, wherein the event may notify or otherwise advertise the new operational image to the discovery engine. Thus, in response to the discovery engine detecting that the new operational image has been added to the shared repository or receiving the event notifying or advertising the new operational image in the shared repository, an operation 270 may include generating a cloud image to prepare the operational image for deployment to the public cloud or the private cloud. In particular, various public clouds and private clouds may support different image formats, wherein operation 270 may include converting the operational image into the appropriate image format for the public cloud or private cloud where the operational image will be deployed (e.g., an Amazon Machine Image format for the Amazon Elastic Compute Cloud). Thus, the cloud image created in operation 270 may be in a cloud image format that depends on an image format used in the public cloud or private cloud that will host the cloud image created in operation 270.

In one implementation, in response to generating the cloud image in operation 270, an image deployment system may be invoked to deploy the cloud image to the appropriate public cloud or private cloud. In one implementation, prior to deploying the cloud images to the appropriate public cloud or private cloud, an operation 275a may include determining whether to invoke an impact analysis engine that determines a potential impact of deploying the cloud images to the public cloud or private cloud. In particular, deploying the cloud images to the public cloud or private cloud may generally include various deployment processes (e.g., starting, stopping, cloning, or migrating the cloud images), wherein the impact analysis optionally performed in operation 275a may include referencing a configuration management database to validate whether the cloud images can be suitably deployed to the public cloud or the private cloud. For example, the impact analysis engine may reference the configuration management database to verify that other resources detailed in the configuration management database will not be adversely affected by deploying the cloud images (e.g., because the deployment may require substantial bandwidth during a period of peak network traffic). Furthermore, the impact analysis engine may communicate with an audit service, a privileged user management service, or other monitoring services provided in the public cloud or the private cloud to enhance the impact analysis (e.g., determining whether conditions in the public cloud or private cloud may have adverse impacts on the deployment, local infrastructure resources, etc.). As such, in response to determining that potential adverse impacts may result from deploying the image to the cloud in an operation 275b, the image may be revalidated in operation 250, or operation 250 may include other processes to resolve the adverse impacts.

In one implementation, in response to determining that deploying the cloud image does not raise potential adverse impacts in operation 275b, or alternatively in response to resolving any such potential adverse impacts, an operation 280 may include deploying the cloud image to the appropriate public cloud or private cloud. Further, in one implementation, the operational image stored in the shared repository in operation 260 may already be appropriate for deployment into the public cloud or private cloud without requiring conversion to a cloud image format in operation 270, in which case operation 280 may include similarly deploying the operational image stored in operation 260 to the public cloud or private cloud. In one implementation, to deploy the cloud images or operational images to the public cloud or private cloud, operation 280 ma include cloning or modifying the cloud image or the operational image (e.g., to preserve an original version of the cloud image or operational image prior to the deployment operation 280). As such, in response to cloning or modifying the image prior to the cloud deployment, operation 280 may further include injecting a new or aggregated identity service into the cloned or modified image, wherein the new or aggregated identity service may provide a record that identifies a lineage, pedigree, or other relationships for the cloned or modified image. Furthermore, operation 280 may include injecting one or more personality tools into the cloned or modified image in response to determining that the personality tools have not already been injected (e.g., during creation of the original software installation in operations 210 and 220). For example, as noted above, the personality tools may generally include tools for privileged user management, remote debugging, or customizing base images (e.g., certain scripts may be applied to a Linux base image in order to customize the base image for particular functions that the image provides).

In one implementation, operation 280 may then include deploying the cloud image or the operational image to the appropriate public cloud or private cloud, wherein operation 280 may further include managing the image deployed to the public or private cloud. For example, as noted above, the image may include an embedded management agent that can control and track any activity associated with the deployed image through interaction with the embedded identity service, including verifying that the image complies with any relevant policies or restricting any activity that may not comply with the relevant policies, as described in further detail above. Further, because the management agent, identity service, and personality tools embedded in the image can control, track, and monitor activities for the image deployed to the public or private cloud, operation 280 may include providing the monitored activity to an audit service in the cloud that can remediate any problems with the image, provide compliance assurance for the activity associated with the image, or otherwise analyze the activity that occurs in the image following deployment to the cloud. Similarly, the embedded identity service may interact with a privileged user management service in the cloud, wherein the privileged user management service and the audit service in the cloud may cooperate in various ways to remediate, assure compliance, or otherwise analyze the activity that occurs in the image following deployment to the cloud.

Figure 3:
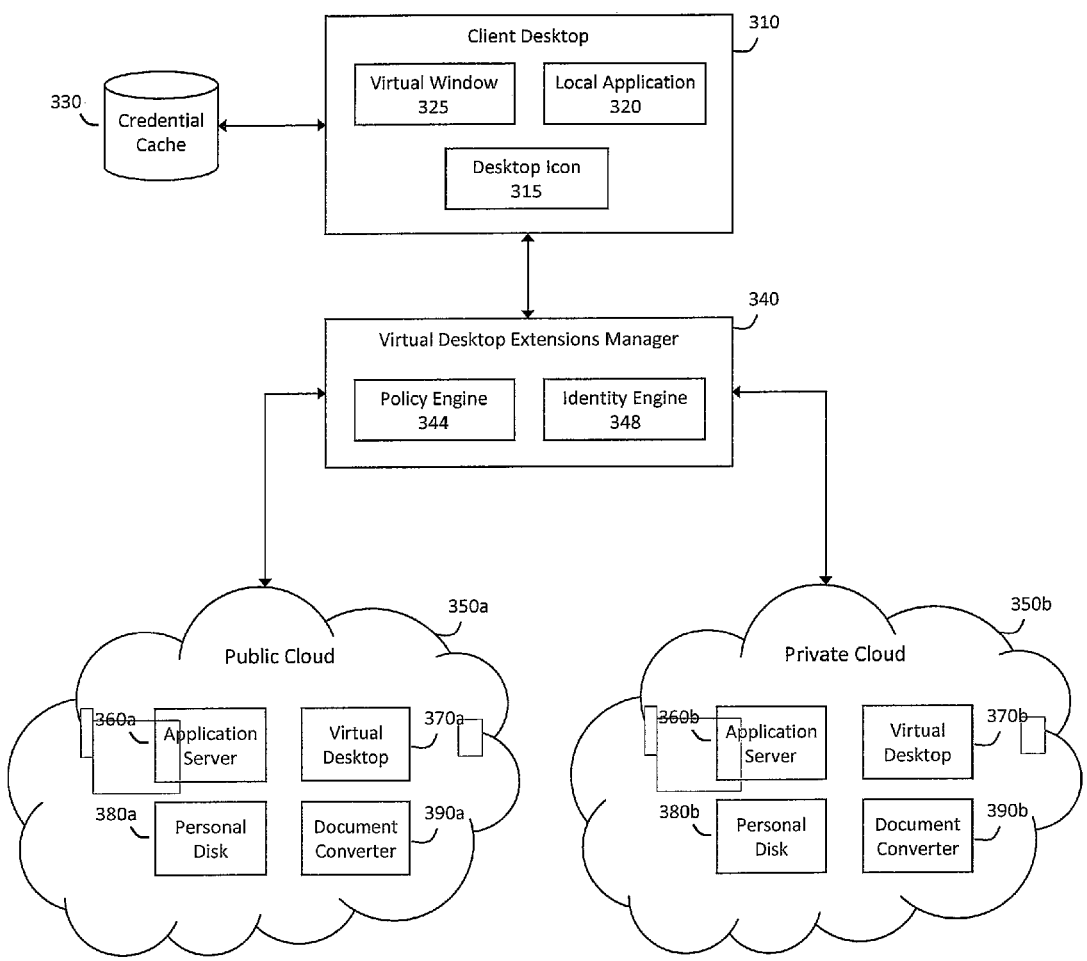
FIG. 3 illustrates an exemplary block diagram of the system for providing virtual desktop extensions on a client desktop, according to one aspect of the invention.

According to one aspect of the invention, FIG. 3 illustrates an exemplary block diagram of the system 300 for providing virtual desktop extensions on a client desktop. In particular, the system 300 shown in FIG. 3 may provide virtual desktop extensions on a client desktop 310 to simplify the complexity associated with identifying and using applications and services that run in virtualized and cloud data centers. For example, the virtualized and cloud data centers may generally include a public cloud 350a (e.g., a cloud computing environment available over a public or unrestricted network), a private cloud 350b (e.g., a cloud computing environment available over a private or restricted network), or any suitable combination thereof. As such, any description provided herein that refers to "the cloud" will be understood to refer to any suitable virtualized data center and/or cloud data center, including the public cloud 350a and/or the private cloud 350b, whether or not explicitly described.

In one implementation, the system 300 illustrated in FIG. 3 and described herein may include a client desktop 310 having a local application 320 that can display a list describing various applications and services available in the cloud 350, wherein a virtual desktop extension may then be provided to the client desktop 310 in response to a user selecting one or more of the available applications and services. Furthermore, in response to the user selecting a certain application or service in the list, an appropriate virtual machine instance configured to run the selected application or service may be launched in the cloud 350. As such, without requiring prior understanding of virtualization, cloud services, remote consoles, or other distributed computing models, a user may simply choose the virtual desktop extension provided to the local client desktop 310 in order to interact with the available applications and services running remotely in the cloud 350. In addition, the client desktop 310 may be provided on any suitable client machine that can connect to a network in communication with the cloud 350 (e.g., desktop machines, mobile devices, server machines, etc.), and the virtual desktop extensions may represent any application or service that can run remotely in the cloud 350, whether or not explicitly described herein.

In one implementation, the virtual desktop extensions provided to the client desktop 310 may generally refer to any suitable application or service provided in the cloud 350. For example, the virtual desktop extensions may include an application server 360 that can run a certain application on a hosted virtual machine, a virtual desktop 370 that can provide a complete desktop environment, a personal disk 380 that can store data on a virtual disk, a document converter 390 that can convert between different document file types, or any other application or service that may be available in the cloud 350. Furthermore, as shown in FIG. 3, the public cloud 350a and the private cloud 350b may host different instances of the virtual desktop extensions, whereby instances the virtual desktop extensions may be provided to the client desktop 310 from the public cloud 350a or the private cloud 350b depending on certain circumstances (e.g., unrestricted or insensitive data may be stored on a personal disk desktop extension 380a provided from the public cloud 350a, while restricted or sensitive data may be stored on a personal disk desktop extension 380b provided from the private cloud 350b).

In one implementation, initializing the system 300 to provide the virtual desktop extensions to the client desktop 310 may generally include installing a local application 320 on the client desktop 310. In particular, the local application 320 installed on the client desktop 310 may connect to a virtual desktop extensions manager 340 and download a list describing the virtual desktop extensions available in the cloud 350 (e.g., virtual desktop extensions 360a-390a in the public cloud 350a, 360b-390b in the private cloud 350b, etc.). In response to initially running the local application 320 on the client desktop 310, the virtual desktop extension manager 340 may prompt the local application 320 for authentication credentials associated with the client desktop 310 (e.g., an identity and password for a user interacting with the client desktop 310). Thus, in response to receiving the authentication credentials associated with the client desktop 310, the local application 320 may provide the authentication credentials to the virtual desktop extension manager 340, wherein the authentication credentials may define the particular virtual desktop extensions that can be provided to the client desktop 310 (e.g., as described in further detail in co-pending U.S. patent application Ser. No. 12/645,114, incorporated by reference above). In addition, the local application 320 may encrypt the authentication credentials associated with the client desktop 310 and store the encrypted authentication credentials in a credential cache 330. As such, the local application 320 may then reference the encrypted authentication credentials stored in the credential cache 330 in response to subsequent virtual desktop extension requests received from the client desktop 310.

In one implementation, initializing the system 300 may further include installing the virtual desktop extension manager 340 on a server with a network interface in communication with the client desktop 310. For example, the virtual desktop extension manager 340 may be installed on a server deployed behind an organizational firewall, in the public cloud 350a, in the private cloud 350b, or any other suitable location. Alternatively (or additionally), an instance of the virtual desktop extension manager 340 may be installed locally on the client desktop 310. In one implementation, the virtual desktop extension manager 340 may then be configured with one or more mappings that describe relationships between certain file types and the virtual desktop extensions 360-390 (e.g., the mappings may describe a relationship between a .doc file type an application server 360 that runs Microsoft Word, a .odt file type and application server 360 that runs OpenOffice, etc.). In addition, the virtual desktop extension manager 340 may be further configured with one or more connection services that define interfaces for connecting, communicating, and otherwise interacting with the virtual desktop extensions 360-390. In one implementation, the virtual desktop extension manager 340 may further include a policy engine 344 and an identity engine 348 that can provide access control, policy enforcement, and compliance assurance for the applications and services provided through the virtual desktop extensions 360-390 hosted in the cloud 350.

In one implementation, in response to installing the local application 320 and the virtual desktop extension manager 340 to initially configure the system 300, the client desktop 310 may then request any virtual desktop extension 360-390 available in the cloud 350. For example, the local application 320 may place a desktop icon 315 on the client desktop 310, wherein a user may simply click the desktop icon 315 to launch the local application 320. In one implementation, the local application 320 may include a background process that executes on the client desktop 310 transparently, a foreground process that executes on the client desktop 310 within a graphical user interface, or any suitable combination thereof. For example, in one implementation, the local application 320 may run transparently in the background of the client desktop 310 and display a minimized icon that can be selected (e.g., from a task bar, a status bar, etc.), wherein the graphical user interface may be displayed in the foreground in response to the user selecting the minimized icon.

In one implementation, the local application 320 executing on the client desktop 310 may then provide the encrypted authentication credentials from the credential cache 330 to the virtual desktop extension manager 340, which may authenticate the client desktop 310 with the authentication credentials received from the local application 320. In particular, the virtual desktop extension manager 340 may reference the authentication credentials for the client desktop 310 to populate the list describing the virtual desktop extensions 360-390 available to the client desktop 310 from the cloud 350. In one implementation, the list of available virtual desktop extensions 360-390 may then be displayed on the client desktop 310, whereby a user may then request one or more of the virtual desktop extensions 360-390 available to the client desktop 310 from the cloud 350. Furthermore, the virtual desktop extension manager 340 may invoke the policy engine 344 and/or the identity engine 348 to filter the list of available virtual desktop extensions 360-390 (e.g., the virtual desktop extensions 360-390 may include various applications that have access restricted to certain users, groups of users, etc.).

In one implementation, in response to receiving a request from the client desktop 310 that identifies one or more of the virtual desktop extensions 360-390 available to the client desktop 310 from the cloud 350, the virtual desktop extension manager 340 may reference the authentication credentials previously received from the local application 320 and determine whether the client desktop 310 has suitable permissions to access or otherwise interact with the requested virtual desktop extensions 360-390. Thus, in response to determining that the client desktop 310 lacks suitable permissions to access or otherwise interact with the requested virtual desktop extensions 360-390, the virtual desktop extension manager 340 may notify the local application 320 that the requested virtual desktop extensions 360-390 cannot be provided to the client desktop 310. Alternatively, in response to authenticating the client desktop 310, the virtual desktop extension manager 340 may connect to one or more virtual machines that host the requested virtual desktop extensions 360-390 in the cloud 350 and launch one or more instances of the requested virtual desktop extensions 360-390 on the virtual machines. For example, to connect the client desktop 310 with the instances of the virtual desktop extensions 360-390 launched in the cloud 350, the virtual desktop extension manager 340 may provision a new virtual machine instance, load an existing virtual machine instance (including any state information previously saved for the existing virtual machine instance), or otherwise launch any suitable combination of new or saved virtual machine instances. Alternatively (or additionally), the desktop icon 315 may represent a generic virtual desktop extension for a particular application (e.g., Microsoft Word). As such, in response to receiving a selection of the generic virtual desktop extension, the local application 320 may locate any suitable server in the cloud 350 that supports the application and launch a virtual machine instance on the located server to run the application in the cloud 350.

In one implementation, in response to launching the one or more instances of the requested virtual desktop extensions 360-390, the virtual desktop extension manager 340 may then generate remote console information that the client desktop 310 can use to interact with the instances of the virtual desktop extensions 360-390 launched in the cloud 350. For example, the remote console information may generally include any suitable virtual network computing (VNC) or remote desktop control system that the client desktop 310 can use to remotely control the instances of the virtual desktop extensions 360-390 launched in the cloud 350 (e.g., an rdesktop open source client application). The virtual desktop extension manager 340 may then return the remote console information to the local application 320 running on the client desktop 310. In one implementation, the local application may then create a desktop icon 315 on the client desktop 310, which may be selected to display a virtual window 325 that can be used to interact with the instances of the virtual desktop extensions 360-390 launched in the cloud 350. For example, the virtual window 325 may represent an entire virtual desktop environment 370, or an application server 360 that only represents the running instance of a particular application server 360. As such, the client desktop 310 may interact with the instance of the virtual desktop extension 360-390 in the cloud 350 through the virtual window 325, whereby the client desktop 310 may then run operating systems or applications that may otherwise lack support on the client desktop 310. For example, the client desktop 310 may be running a Linux operating system, while the virtual desktop extension may include an application server 360 running a Windows virtual machine, whereby the client desktop 310 may locally control Windows applications that the Linux operating system would otherwise not support.

In one implementation, as noted above, the virtual desktop extensions that can be provided to the client desktop 310 may further include a virtual personal disk 380. For example, the client desktop 310 may request storage resources that can be dynamically allocated in the cloud 350 through the local application 320, which may then provide the client desktop 310 with a desktop icon 315 that represents a virtual personal disk 380 available in the cloud 350. Thus, a user may click on the desktop icon 315 that represents the virtual personal disk 380, which may make the virtual personal disk 380 hosted in the cloud 350 locally available on the client desktop 310. For example, in response to the user clicking on the desktop icon 315 that represents the virtual personal disk 380, the virtual desktop extension manager 340 may request a new virtual machine instance in the cloud 350 and attach the virtual personal disk 380 to the virtual machine instance. Alternatively, if the user previously created the virtual personal disk 380, the virtual desktop extension manager 340 may load a previously created instance of the virtual machine instance attached to the virtual personal disk 380, including any previously saved state associated with the previously created instance of the virtual machine instance (i.e., the virtual machine instance attached to the virtual personal disk 380 may maintain a state that describes data stored on the virtual personal disk 380, pointers to storage locations that contain the data stored on the virtual personal disk 380, etc.). In one implementation, the local application 320 may then establish a Network File System (NFS) or other suitable connection between the client desktop 310 and the virtual machine instance attached to the virtual personal disk 380.

In one implementation, the client desktop 310 may further launch the local application 320 and/or the virtual desktop extension manager 340 to interact with documents that have file types otherwise lacking support on the client desktop 310.

For example, in response to a user clicking on a document that the client desktop 310 does not support (e.g., a document having an unknown file type, a file type that requires the client desktop 310 to install a new application that supports the file type, etc.), the local application 320 may connect to the virtual desktop extension manager 340 and identify the file type associated with the document. In one implementation, the virtual desktop extension manager 340 may then launch a virtual machine instance for an application server 360 that supports the identified file type and send the document to the launched instance of the application server 360. As such, the application server 360 may then open the document in the cloud 350, wherein the virtual desktop extension manager 340 may then return remote console information in the virtual window 325 that the client desktop 310 can then use to interact with the document on the application server 360. The virtual desktop extension manager 340 may then monitor the client desktop 310 interacting with the document on the application server 360, wherein the virtual desktop extension manager 340 may copy the document from the application server 360 to the client desktop 310 in response to determining that the document has been modified on the application server 360 (i.e., an original version of the document may be replaced with the document modified on the application server 360 to preserve consistency for the document on the client desktop 310 and the document on the application server 360).

Alternatively, in one implementation, the virtual desktop extension manager 340 may invoke the policy engine 344 to identify one or more virtual machine instances in the cloud 350 running a document converter 390 that can convert the unsupported document to a file type that the client desktop 310 supports. For example, the policy engine 344 may determine one or more file types that the client desktop 310 supports and one or more file types that the document converters 390 running in the cloud 350 support (e.g., from the mappings used to initially configure the virtual desktop extension manager 340). Thus, in response to identifying an appropriate virtual machine instance hosting a document converter 390 that can convert the document to a file type that the client desktop 310 supports, the virtual desktop extension manager 340 may connect to the identified virtual machine instance and invoke the document converter 390 hosted on the identified virtual machine instance. The document converter 390 may then convert the document to a file type that the client desktop 310 supports, and the virtual desktop extension manager 340 may then return the converted document to the client desktop 310. As such, the client desktop 310 may then open the document with any appropriate application running on the client desktop 310 that supports the converted document file type.

Figure 4:
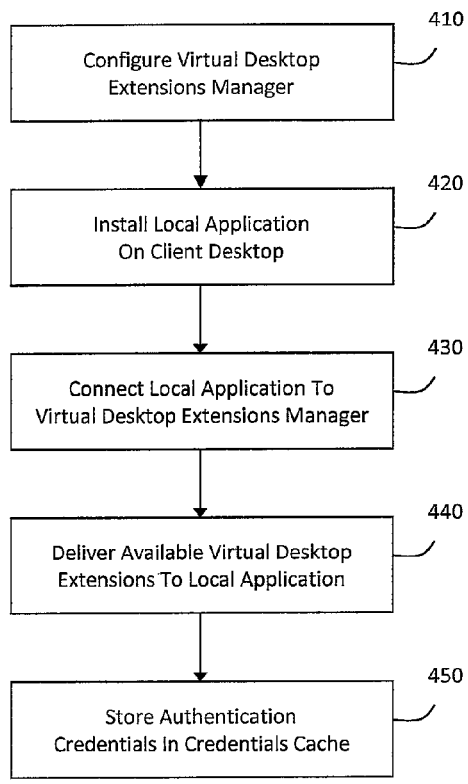
FIG. 4 illustrates a flow diagram of an exemplary method for initially configuring the system for providing virtual desktop extensions on a client desktop, according to one aspect of the invention.

According to one aspect of the invention, FIG. 4 illustrates a flow diagram of an exemplary method 400 for initially configuring the system for providing virtual desktop extensions on a client desktop. In particular, the method 400 shown in FIG. 4 and described herein may generally be performed to initialize the system to provide the virtual desktop extensions on the client desktop. In one implementation, the initialization method 400 may include an operation 410 that configures a virtual desktop extension manager. For example, in one implementation, configuring the virtual desktop extension manager in operation 410 may include installing the virtual desktop extension manager on a server with a network interface in communication with the client desktop (e.g., on a server deployed behind a firewall, in a public cloud, in a private cloud, or any other suitable location in communication with the client desktop). Alternatively (or additionally), an instance of the virtual desktop extension manager may be installed locally on the client desktop. As such, the system for providing virtual desktop extensions on the client desktop may include one or more virtual desktop extension managers, which may be deployed in various different locations, and which the client desktop can interact with to request and control virtual desktop extensions hosted in the cloud.

In one implementation, operation 410 may further include configuring the virtual desktop extension manager with one or more mappings that describe relationships between certain file types and the virtual desktop extensions available in the cloud (e.g., the mappings may describe a relationship between a .doc file type an application server that runs Microsoft Word, a .odt file type and application server that runs OpenOffice, etc.). In addition, operation 410 may further include configuring the virtual desktop extension manager with one or more connection services that define interfaces for connecting, communicating, and otherwise interacting with the virtual desktop extensions hosted in the cloud. In one implementation, the virtual desktop extension manager may initialize a policy engine and an identity engine in operation 410, wherein the policy engine and the identity engine may collectively provide access control, policy enforcement, and compliance assurance for the applications and services provided through the virtual desktop extensions hosted in the cloud (e.g., as described in further detail in co-pending U.S. patent application Ser. No. 12/645,114, incorporated by reference above).

In one implementation, in response to configuring the virtual desktop extension manager, an operation 420 may include installing a local application on the client desktop, wherein the local application may execute on the client desktop to control interaction between the client desktop, the virtual desktop extension manager, and the virtual desktop extensions hosted in the cloud. For example, in an operation 430, the local application installed on the client desktop may connect to the virtual desktop extensions manager and download a list describing the virtual desktop extensions available in the cloud (e.g., virtual desktop extensions hosted in the public cloud, virtual desktop extensions hosted in the private cloud, etc.). In response to the local application initially running on the client desktop and then connecting to the virtual desktop extension manager, the local application may receive a prompt from the virtual desktop extension manager that requests authentication credentials for the client desktop (e.g., an identity and password for a user interacting with the client desktop). Furthermore, the client desktop may be provided on any suitable client machine that can connect to a network in communication with the cloud (e.g., desktop machines, mobile devices, server machines, etc.), and the virtual desktop extensions may represent any application or service that can run remotely in the cloud, whether or not explicitly described herein.

In one implementation, in response to receiving the authentication credentials for the client desktop, an operation 440 may include the local application providing the authentication credentials to the virtual desktop extension manager, wherein the authentication credentials may define the particular virtual desktop extensions that can be provided to the client desktop. In particular, the virtual desktop extension manager may authenticate the client desktop with the authentication credentials received from the local application to populate the list describing the virtual desktop extensions hosted in the cloud that the client desktop has permission to access. For example, the virtual desktop extension manager may invoke the policy engine and/or the identity engine to filter the list of available virtual desktop extensions (e.g., the virtual desktop extensions may include various applications associated with policies that restrict access to certain users, groups of users, etc.). As such, in response to the virtual desktop extension manager populating the list describing the virtual desktop extensions available to the client desktop from the cloud, the virtual desktop extension manager may deliver the list describing the available virtual desktop extensions to the local application in operation 440. The local application may then display the list of available virtual desktop extensions on the client desktop, whereby a user may then request any virtual desktop extension in the list.

Additionally, in one implementation, the initialization method 400 may further include an operation 450, wherein the local application may encrypt the authentication credentials for the client desktop and then store the encrypted authentication credentials in a credential cache locally coupled to the client desktop. As such, the local application may then reference the encrypted authentication credentials in the credential cache to handle subsequent requests for virtual desktop extensions that the local application receives from the client desktop.

Figure 5A:
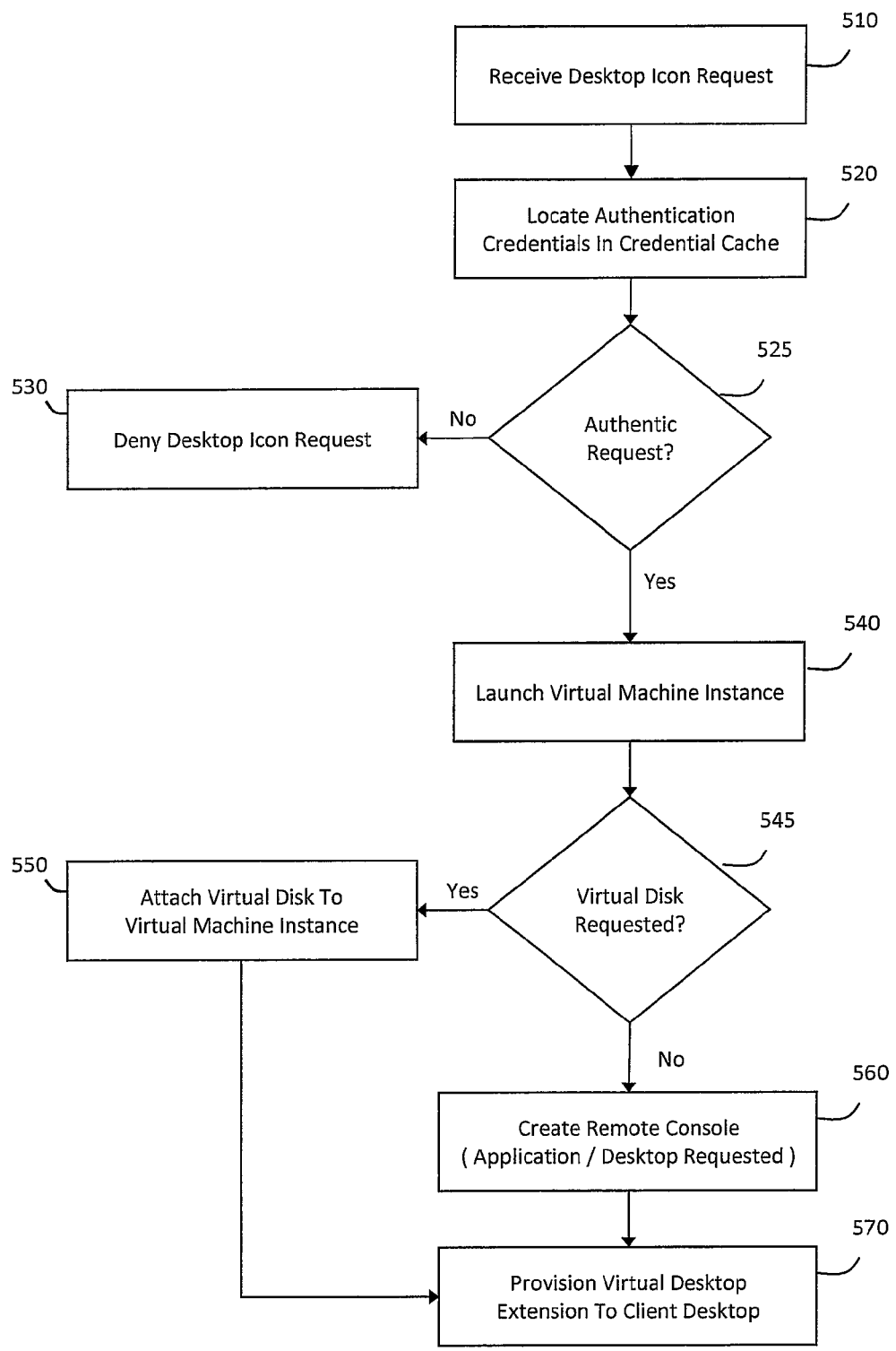
FIG. 5A illustrates a flow diagram of an exemplary method for servicing desktop icon requests in the system for providing virtual desktop extensions on a client desktop, according to one aspect of the invention.

According to one aspect of the invention, FIG. 5A illustrates a flow diagram of an exemplary method 500A for servicing desktop icon requests in the system for providing virtual desktop extensions on a client desktop. More particularly, in response to installing the local application and the virtual desktop extension manager to initially configure the system (e.g., as described in further detail above with reference to FIG. 4), the client desktop may then request any virtual desktop extension available in the cloud (e.g., an application server that runs a certain application on a hosted virtual machine, a virtual desktop that provides a complete desktop environment on a hosted virtual machine, a personal disk that stores data on a virtual disk attached to a hosted virtual machine, etc.).

For example, in one implementation, the local application may place an icon on the client desktop in response to the local application having been installed on the client desktop, wherein a user may then select the icon on the client desktop to launch the local application and request a virtual desktop extension. In one implementation, in response to launching the local application, a background process may then execute the local application on the client desktop transparently, or a foreground process may execute the local application on the client desktop within a graphical user interface. Alternatively (or additionally), the local application may be suitably executed with a combination of the background process and the foreground process (e.g., the background process may execute the local application transparently and the foreground process may be initiated to display the graphical user interface in response to the user selecting a minimized icon from a task bar, status bar, or other visual display element). In one implementation, the local application executing on the client desktop may then display a list describing various applications and services in the cloud that the client desktop can access (e.g., the local application may download the list from the virtual desktop extensions manager, which may populate the list describing the available applications and services based on authentication credentials associated with the client desktop). Thus, an operation 510 may include receiving a desktop icon request in response to the user selecting one or more of the virtual desktop extensions in the list that the local application displays on the client desktop.

In one implementation, the local application executing on the client desktop may then locate authentication credentials for the client desktop from a credential cache locally coupled to the client desktop in an operation 520 (e.g., an identity and a password for a user interacting with the client desktop). The local application may then provide the authentication credentials to a virtual desktop extension manager, which may invoke a policy engine and/or an identity engine in an operation 525. In particular, operation 525 may generally include the policy engine and/or the identity engine analyzing the authentication credentials received from the local application to determine whether the desktop icon request received from the client desktop includes an authentic request. In particular, operation 525 may include the policy engine and/or the identity engine referencing the authentication credentials for the client desktop to determine whether the client desktop has suitable permissions to access or otherwise interact with a virtual desktop extension identified in the desktop icon request.

Thus, in response to determining that the client desktop lacks suitable permissions to access or otherwise interact with the virtual desktop extension identified in the desktop icon request, an operation 530 may include the virtual desktop extension manager notifying the local application that the virtual desktop extension cannot be provided to the client desktop (i.e., the virtual desktop extension manager may deny the desktop icon request). For example, in one implementation, the desktop icon request may be denied in operation 530 in response to determining that the authentication credentials for the client desktop do not identify a user, group of users, or another identity that has permission to access the virtual desktop extension identified in the request. Alternatively, in response to authenticating the desktop icon request received from the client desktop in operation 525, the virtual desktop extension manager may connect to a virtual machine in the cloud that hosts the virtual desktop extension identified in the desktop icon request. In one implementation, an operation 540 may then include the virtual desktop extension manager launching an instance of the virtual desktop extension on the virtual machine. For example, launching the virtual machine instance to host the requested virtual desktop extension in operation 540 may include the virtual desktop extension manager provisioning a new instance of the virtual machine, loading an existing instance of the virtual machine (including any state previously saved for the existing virtual machine instance), or otherwise launching any suitable combination of a new or saved virtual machine instance. Alternatively (or additionally), the desktop icon 315 may represent a generic virtual desktop extension for a particular application (e.g., Microsoft Word). As such, in response to receiving a selection of the generic virtual desktop extension, the local application 320 may locate any suitable server in the cloud 350 that supports the application and launch a virtual machine instance on the located server to run the application in the cloud 350.

In one implementation, in response to launching the virtual machine instances to host the virtual desktop extension identified in the desktop icon request, an operation 545 may determine whether the desktop icon request identifies a virtual desktop extension for a virtual personal disk, an application server, or a virtual desktop environment. In one implementation, in response to determining that the desktop icon request identifies the virtual personal disk desktop extension, an operation 550 may include attaching the personal virtual disk to the virtual machine instance previously launched in operation 540. For example, in response to determining that the desktop icon request received in operation 510 requests dynamically allocated storage resources in the cloud, the virtual desktop extension manager may create a virtual personal disk in the cloud and allocate the requested storage resources to the created virtual personal disk. As such, operation 550 may include attaching the virtual personal disk created in the cloud to the virtual machine instance launched in operation 540. Alternatively, if the desktop icon requests identifies an existing virtual personal disk (e.g., requesting additional storage resources for the existing virtual personal disk), the virtual desktop extension manager may load any previously saved state information for the existing virtual machine instance and the attached virtual personal disk, wherein operation 550 may further include the virtual desktop extension manager allocating or otherwise managing the existing virtual personal disk in accordance with the request. In one implementation, an operation 570 may then include provisioning a suitable virtual desktop extension to the client desktop. For example, in one implementation, operation 570 may include the local application establishing an NFS connection or another suitable connection between the client desktop and the virtual machine instance attached to the virtual personal disk, and may further include the local application providing the client desktop with a desktop icon that represents the virtual personal disk in the cloud. Thus, a user may then click on the desktop icon that represents the virtual personal disk to locally interact with the virtual personal disk remotely hosted in the cloud.

Alternatively, in response to determining that the desktop icon request identifies one of the application server or virtual desktop environment extensions, the virtual desktop extension manager may generate remote console information for the requested virtual desktop extension in an operation 560. In particular, the remote console information generated in operation 560 may enable the client desktop to interact with the virtual machine instance created in operation 540 to host the virtual desktop extension in the cloud. For example, the remote console information may generally include any suitable VNC system or other remote desktop control system that the client desktop can use to remotely control the virtual machine instance that hosts the virtual desktop extension in the cloud (e.g., rdesktop or another remote consoled system or application). The virtual desktop extension manager may then return the remote console information to the local application running on the client desktop in operation 570, wherein the local application may provision create a desktop icon on the client desktop to provision the virtual desktop extension to the client desktop. As such, the desktop icon may be selected to display a virtual window that the client desktop can use to interact with the remote virtual machine instance that hosts the application server virtual desktop extension in the cloud. For example, if the requested virtual desktop extension includes a virtual desktop environment, the virtual window may display an entire virtual desktop environment running remotely in the cloud, whereas if the requested virtual desktop extension includes an application server, the virtual window may only display an interface for a remote application running on the application server hosted in the cloud. In either scenario, the virtual window may provide the client desktop with local control over the virtual desktop extension running remotely in the cloud.

Figure 5B:
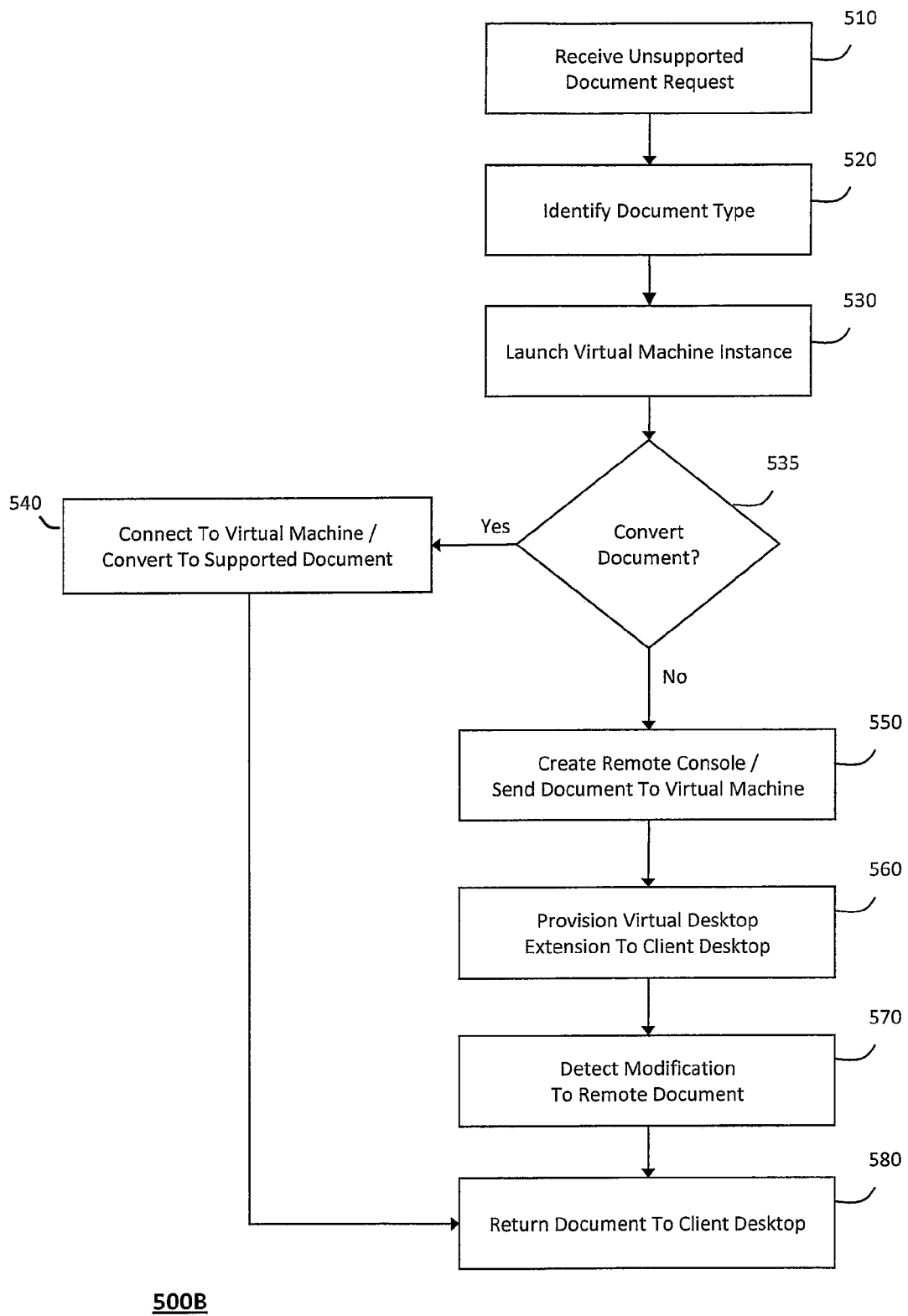
FIG. 5B illustrates a flow diagram of an exemplary method for servicing unsupported document requests in the system for providing virtual desktop extensions on a client desktop, according to one aspect of the invention.

According to one aspect of the invention, FIG. 5B illustrates a flow diagram of an exemplary method 500B for servicing unsupported document requests in the system for providing virtual desktop extensions on a client desktop. More particularly, in response to installing the local application and the virtual desktop extension manager to initially configure the system (e.g., as described in further detail above with reference to FIG. 4), the client desktop may then request any virtual desktop extension available in the cloud (e.g., document converters hosted on virtual machines that can convert between different document file types, application servers hosted on virtual machines running certain applications that can open or otherwise support different document file types, etc.).

For example, in one implementation, an operation 510 may include launching the local application in response to an unsupported document request. For example, operation 510 may automatically launch the local application in response to a user clicking on a document on the client desktop that lacks support on the client desktop (e.g., a document having an unknown file type, a file type that requires the client desktop to install a new application that supports the file type, etc.). Thus, in response to receiving the unsupported document request, an operation 520 may include the local application connecting to the virtual desktop extension manager and identifying the file type associated with the document. In one implementation, the virtual desktop extension manager may then launch a virtual machine instance for an appropriate application server that supports the identified file type in operation 530 (e.g., the policy engine may identify a virtual machine instance hosted in the cloud that runs a document converter that can convert the unsupported document to a file type that the client desktop supports). The virtual desktop extension manager may then send the unsupported document to the launched application server instance in operation 530.

In one implementation, in response to launching the application server instance that runs an application that supports the document file type, an operation 535 may determine whether to convert the document into a file type supported on the client desktop or create a virtual window that the client desktop can use to locally control the application server instance launched in the cloud. For example, the unsupported document request received in operation 510 may indicate whether to return a converted version of the document that the client desktop locally supports or whether to remotely control the unsupported document opened on the application server instance launched in the cloud. Thus, in response to determining that the unsupported document request instructs the local application to return the converted (supported) version of the document to the client desktop, an operation 540 may include the virtual desktop extension manager invoking the document converter hosted in the cloud that can convert the unsupported document to a file type that the client desktop supports. The document converter may then convert the document to a file type that the client desktop supports, and the virtual desktop extension manager may return the converted document to the client desktop in an operation 580. As such, the client desktop may then open the document in the converted file type with any appropriate application running on the client desktop that supports the converted file type for the document.

Alternatively, in response to determining that the unsupported document request instructs the local application to provide remote control for the document opened on the application server instance launched in the cloud, the application server instance may open the document and the virtual desktop extension manager may return remote console information to the client desktop in an operation 550. Furthermore, an operation 560 may include the virtual desktop extension provisioning a virtual desktop extension (e.g., a desktop icon) to the client desktop that can be selected to display a virtual window for interacting with the document remotely opened on the application server. In an operation 570, the virtual desktop extension manager may then monitor interaction between the client desktop and the document opened on the remotely running application server. As such, in response to detecting that the document has been modified on the application server in an operation 570, the virtual desktop extension manager may copy the modified document from the application server to the client desktop in an operation 580. In particular, operation 580 may replace the original document on the client desktop with the modified document on the application server to synchronize the document between the client desktop and the application server.

Implementations of the invention may be made in hardware, firmware, software, or various combinations thereof. The invention may also be implemented as instructions stored on a machine-readable medium, which may be read and executed using one or more processing devices. In one implementation, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A system for providing virtual desktop extensions on a client desktop, comprising:
  a virtual desktop extension manager in communication with a client machine having a desktop interface, and in communication with a cloud computing environment, wherein the virtual desktop extension manager is configured to:
    receive a request from a local application executing on the client machine, wherein the request identifies one or more virtual desktop extensions available to the client machine in the cloud computing environment;
    receive authentication credentials for the client machine from a credentials cache locally coupled to the client machine;
    determine whether to cause one or more virtual machine instances that host one or more identified virtual desktop extensions to be launched in a public cloud computing environment or to be launched in a private cloud computing environment; and
    cause the cloud computing environment to launch the one or more virtual machine instances that host the one or more identified virtual desktop extensions in one of the public cloud computing environment or the private cloud computing environment in response to determining that the authentication credentials received from the credentials cache indicate that the client machine has access to the one or more identified virtual desktop extensions, wherein the one or more hosted virtual desktop extensions are displayable by the local application executing on the desktop interface for the client machine.

2. The system of claim 1, wherein the virtual desktop extension manager includes one or both of a policy engine and an identity engine, wherein one or both of the policy engine and the identity engine are configured to determine whether the authentication credentials received from the credentials cache indicate that the client machine has access to the one or more identified virtual desktop extensions.

3. The system of claim 2, wherein the virtual desktop extension manager includes:
  one or more mappings that describe relationships between one or more file types and a plurality of virtual desktop extensions available in the cloud computing environment; and
  one or more connection services that define interfaces for connecting the client machine to the plurality of virtual desktop extensions available in the cloud computing environment.

4. The system of claim 1, wherein the virtual desktop extension manager is further configured to return remote console information to the client machine, wherein the client machine is configured to use the remote console information to interact with the one or more virtual machine instances that host the one or more virtual desktop extensions in the cloud computing environment.

5. The system of claim 4, wherein the remote console information returned by the virtual desktop extension manager is usable by the local application to create a virtual window on the desktop interface that the client machine uses to interact with one or more of an application server or a complete desktop environment that hosts the one or more virtual desktop extensions in the cloud computing environment.

6. The system of claim 5, wherein the remote console information is usable by the client machine to interact with the application server or the complete desktop environment to run an application that supports a document that lacks support on the client machine.

7. The system of claim 5, wherein the virtual window is configured to provide the remote console information that the client machine uses to interact with the one or more virtual machine instances that host the one or more virtual desktop extensions in the cloud computing environment.

8. The system of claim 1, wherein the virtual desktop extension manager is further configured to attach a personal virtual disk to the one or more virtual machine instances that host the one or more virtual desktop extensions in the cloud computing environment, and wherein the local application is configured to display an icon on the desktop interface that the client machine uses to interact with the personal virtual disk in the cloud computing environment.

9. The system of claim 1, wherein the virtual desktop extension manager is further configured to:
  invoke an application server that hosts the one or more virtual desktop extensions in the cloud computing environment, wherein the application server is configured to convert a document that lacks support on the client machine into a file type that the client machine supports; and return the document converted into the file type that the client machine supports to the client machine.

10. The system of claim 1, wherein the request identifies a plurality of desktop extensions available to the client machine in the cloud computing environment and the client machine is a first client machine, wherein the virtual desktop extension manager is further configured to:

receive the authentication credentials by receiving first authentication credentials stored at the credentials cache;

determine, based on the first authentication credentials, that the first client machine has access to a first subset of the plurality of virtual desktop extensions available in the cloud computing;

receive second authentication credentials stored at the credentials cache; and determine, based on the second authentication credentials, that a second client machine has access to a second subset of the plurality of virtual desktop extensions available in the cloud computing, the second subset being different from the first subset.

11. A computer-implemented method for providing virtual desktop extensions on a client desktop, the method being implemented on a computer system that includes one or more physical processors, the method comprising:

receiving, at a virtual desktop extension manager in communication with a client machine displaying a desktop interface, a request from a local application executing on the client machine, wherein the request identifies one or more virtual desktop extensions available to the client machine in the cloud computing environment;

receiving, at the virtual desktop extension manager, authentication credentials for the client machine from a credentials cache locally coupled to the client machine;

determining, by the virtual desktop extension manager, whether to launch one or more virtual machine instances that host one or more identified virtual desktop extensions in a public cloud computing environment or a private cloud computing environment;

causing, by the virtual desktop extension manager, launching of the one or more virtual machine instances that host the one or more virtual desktop extensions in one of the public cloud computing environment or the private cloud computing environment in response to determining that the authentication credentials received from the credentials cache indicate that the client machine has access to the one or more identified virtual desktop extensions; and connecting, with one or more connection services of the virtual desktop extension manager, the client machine to the one or more virtual desktop extensions hosted by the virtual machine instance.

12. The method of claim 11, wherein the virtual desktop extension manager includes one or both of a policy engine and an identity engine, wherein one or both of the policy engine and the identity engine are configured are configured to determine whether the authentication credentials received from the credentials cache indicate that the client machine has access to the one or more identified virtual desktop extensions.

13. The method of claim 12, wherein the virtual desktop extension manager includes:

one or more mappings that describe relationships between one or more file types and a plurality of virtual desktop extensions available in the cloud computing environment; and one or more connection services that define interfaces for connecting the client machine to the plurality of virtual desktop extensions available in the cloud computing environment.

14. The method of claim 11, further comprising returning remote console information from the virtual desktop extension manager to the client machine, wherein the client machine is configured to use the remote console information to interact with the one or more virtual machine instances that host the one or more virtual desktop extensions in the cloud computing environment.

15. The method of claim 14, wherein the remote console information returned by the virtual desktop extension manager is usable by the local application to create a virtual window on the desktop interface that the client machine uses to interact with one or more of an application server or a complete desktop environment that hosts the one or more virtual desktop extensions in the cloud computing environment.

16. The method of claim 15, wherein the remote console information is usable by the client machine to interact with the application server or the complete desktop environment to run an application that supports a document that lacks support on the client machine.

17. The method of claim 15, wherein the virtual window is configured to provide the remote console information that the client machine uses to interact with the one or more virtual machine instances that host the one or more virtual desktop extensions in the cloud computing environment.

18. The method of claim 11, further comprising:

attaching, by the virtual desktop extension manager, a personal virtual disk to the one or more virtual machine instances that host the one or more virtual desktop extensions in the cloud computing environment.

19. The method of claim 11, further comprising:

invoking, by the virtual desktop extension manager, an application server that hosts the one or more virtual desktop extensions in the cloud computing environment, wherein the application server is configured to convert a document that lacks support on the client machine into a file type that the client machine supports; and returning the document converted into the file type that the client machine supports from the virtual desktop extension manager to the client machine.

20. A system for providing virtual desktop extensions on a client desktop, comprising:

a virtual desktop extension manager in communication with a client machine having a desktop interface, and in communication with a cloud computing environment, wherein the virtual desktop extension manager is configured to:

receive a request from a local application executing on the client machine, wherein the request identifies one or more virtual desktop extensions available to the client machine in the cloud computing environment;

receive authentication credentials for the client machine from a credentials cache locally coupled to the client machine;

cause the cloud computing environment to launch one or more virtual machine instances that host an identified one or more virtual desktop extensions in the cloud computing environment in response to determining that the authentication credentials received from the credentials cache indicate that the client machine has access to the identified one or more virtual desktop extensions, wherein the hosted one or more virtual desktop extension are displayable by the local application executing on the desktop interface for the client machine;

invoke an application server that hosts the one or more virtual desktop extensions in the cloud computing environment, wherein the application server is configured to convert a document that lacks support on the client machine into a file type that the client machine supports; and return, to the client machine, the document converted into the file type that the client machine supports.

* * * * *